April 14, 1959   L. A. AMTSBERG   2,881,888
TORQUE CONTROL CLUTCH

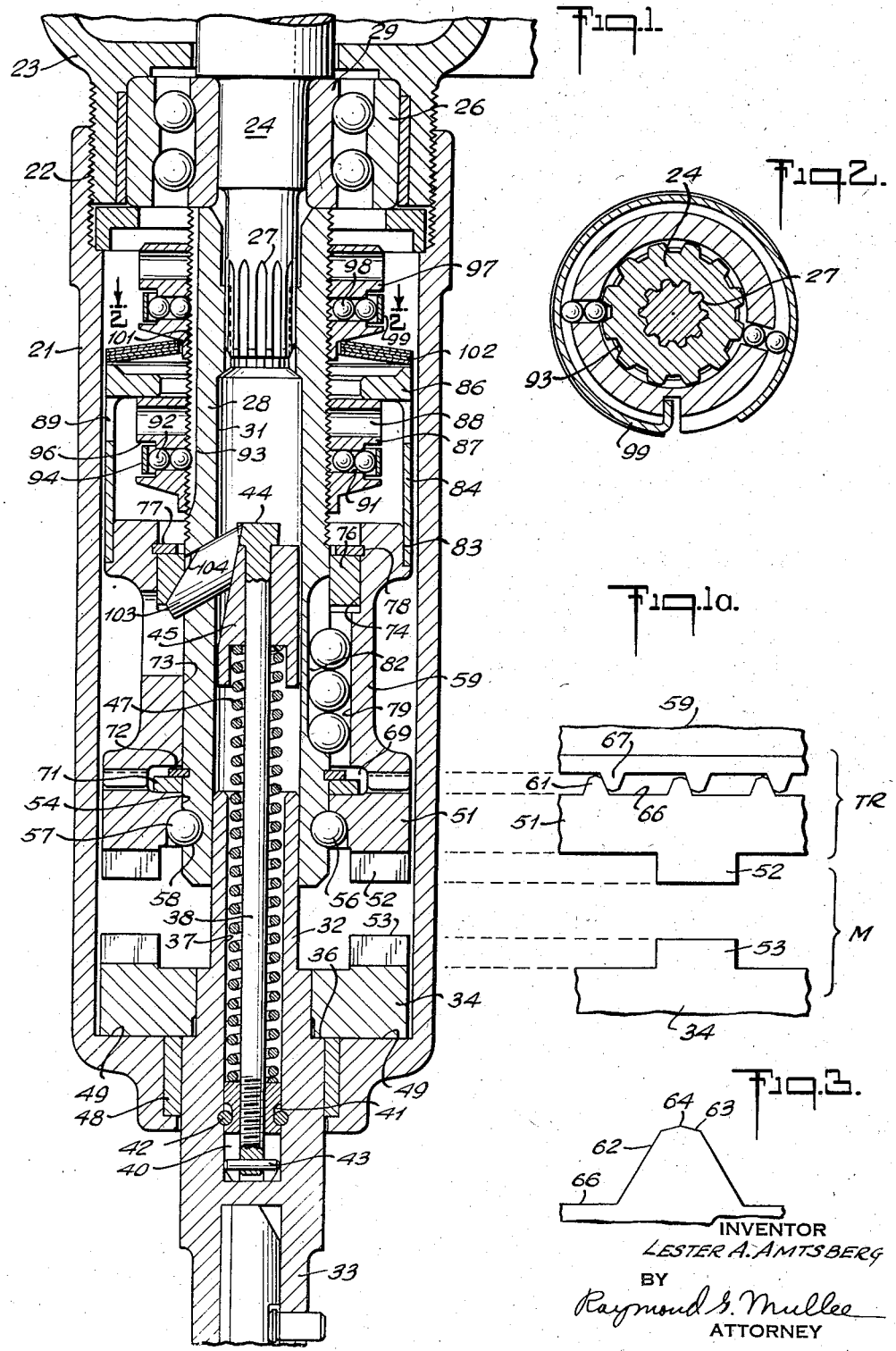

Filed Jan. 26, 1954   3 Sheets-Sheet 2

INVENTOR
LESTER A. AMTSBERG
BY
Raymond G. Muller
ATTORNEY

April 14, 1959 L. A. AMTSBERG 2,881,888
TORQUE CONTROL CLUTCH
Filed Jan. 26, 1954 3 Sheets-Sheet 3
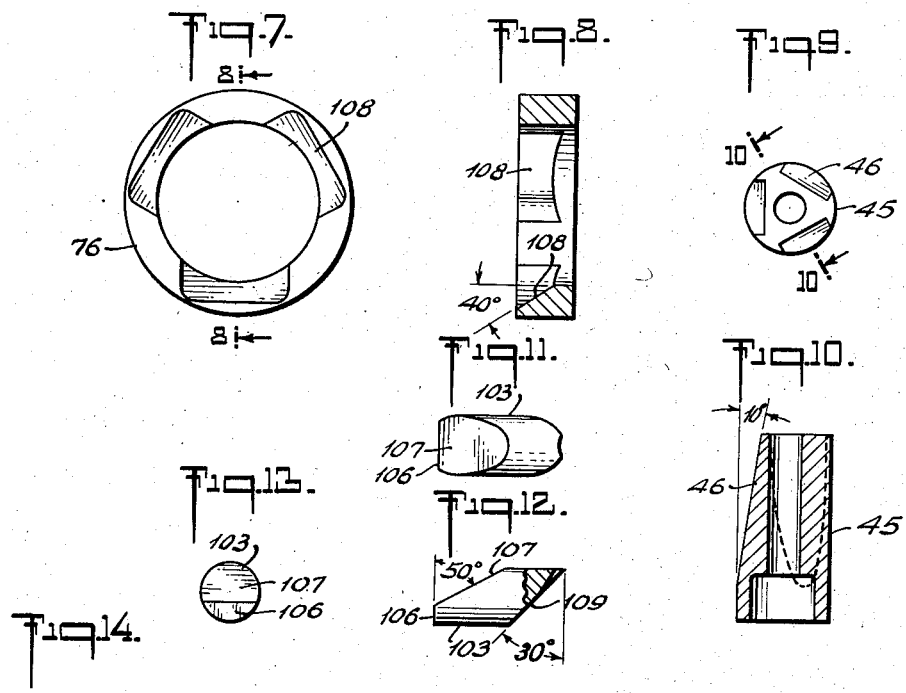
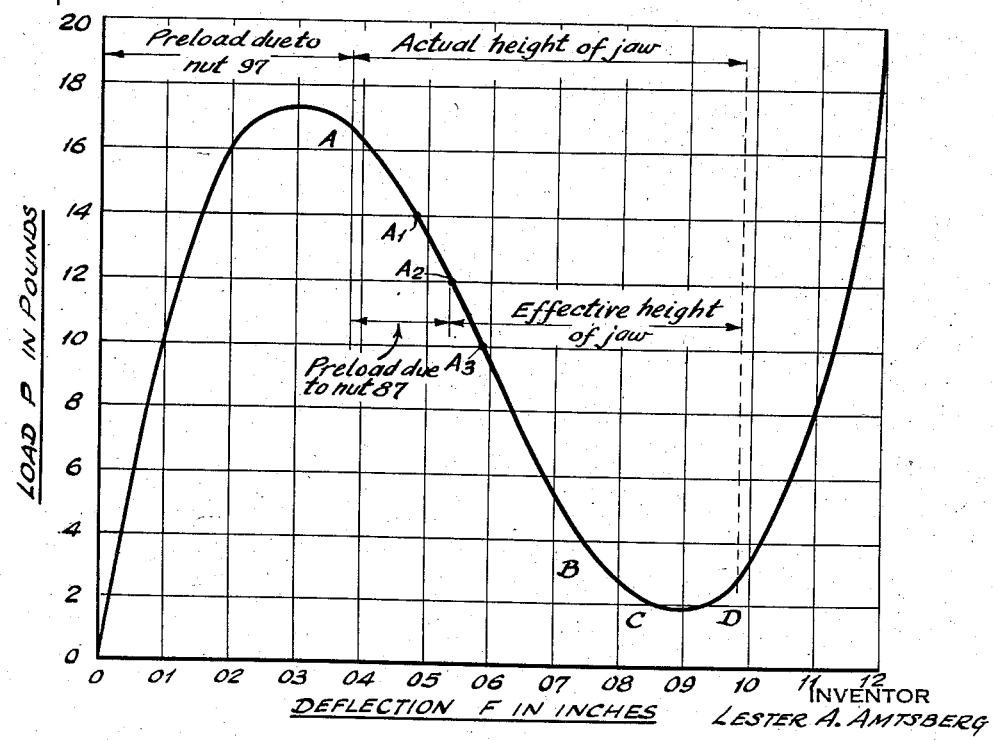
INVENTOR
LESTER A. AMTSBERG
BY
Raymond G. Mullee
ATTORNEY

United States Patent Office 2,881,888
Patented Apr. 14, 1959

2,881,888

TORQUE CONTROL CLUTCH

Lester A. Amtsberg, Utica, N.Y., assignor to Chicago Pneumatic Tool Company, New York, N.Y., a corporation of New Jersey Application January 26, 1954, Serial No. 406,268

11 Claims. (Cl. 192—56)

This invention relates to improvements in torque control clutches of the type wherein torque transmitting members are disengaged at a predetermined torque load, and are automatically maintained in disengaged condition until reset.

The device of the subject invention is particularly useful for application to tools used for setting threaded fasteners in mass production assembly operations. Briefly the invention, in its illustrative embodiment, comprises a clutch assembly arranged in a threaded fastener setting tool and including a driving clutch plate, an intermediate clutch plate and a driven clutch plate, all rotatably and coaxially arranged. The driving clutch plate is mounted for axial movement with respect to the intermediate clutch plate, and has cam shaped teeth which engage with corresponding teeth formed on the intermediate clutch plate. The cam teeth have the effect of resolving the driving force into two components, one in a rotational direction for turning the driven plate and the other in an axial direction tending to separate the driving from the driven plate. A Belleville type spring is arranged to exert a holding force upon the driving clutch plate to resist axial movement thereof. As resistance to rotation of the driven plate increases, the axial component of force between the clutch plates increases in proportion to the rotational component, thus tending to move the driving plate in a declutching direction. This tendency is resisted by the pressure of the Belleville spring which has a greater holding force when the clutch plates are fully engaged than when they are partly disengaged, unlike the conventional compression springs employed in prior art devices. Thus the clutch parts rotate in unison, without the usual rubbing or wearing action between the teeth until the fastener has been set to its predetermined tightness and the axial component of force rises to a value sufficient to overcome the holding force of the Belleville spring. Thereupon the cam shaped teeth move the driving plate quickly toward disengagement from the intermediate plate thereby compressing the Belleville spring to a point where its compressive resistance will be minimum at a predetermined torque load, thus permitting the complete separation of the driving and intermediate clutch plates, and discontinuing rotation of the driven plate. A holding arrangement, or snubber, is arranged to hold the driving plate from re-engagement with the intermediate plate until the operator of the tool releases tool pressure against the work piece, following which the driving plate moves so that the clutch teeth thereof re-engage the intermediate clutch plate teeth.

The main object of this invention is to provide a torque control clutch which will discontinue transmission of output torque when a predetermined torque is developed, and will prevent further transmission of output torque until the clutch is reset.

A further object of the invention is to provide a torque control clutch including disengaging clutch plates having cam-shaped teeth arranged to cam the clutch plates apart during clutch operation and compress a Belleville type spring so that the latter will provide minimum compressive resistance at predetermined torque load and effect disengagement of the clutch plates, and further including a snubber to prevent re-engagement of the clutch plate teeth until the clutch is to be reset.

Another object is to provide a threaded fastener setting tool with a clutch arrangement having co-axially arranged clutch plates with cam-shaped teeth, a cooperating Belleville spring and a snubber, all arranged to affect total separation of the clutch plates at a predetermined torque load so that the possibility of clutch teeth ratcheting, or re-engaging, after initial disengagement of the clutch plates is avoided.

A further object is to provide a threaded fastener setting tool with a torque control clutch arrangement which can be easily adjusted to discontinue torque output at some predetermined value of output torque.

Still another object is to provide a threaded fastener setting tool with a torque control clutch arrangement as heretofore set forth, which will function equally well in either direction of tool rotation.

Another object is to provide a threaded fastener setting tool with a torque control clutch arrangement which is reliable in operation, easy to adjust and maintain, and which will give long and satisfactory service.

These and further objects and features of the invention will become more apparent from an understanding of the following description when considered with the attached drawings wherein:

Fig. 1 is a longitudinal section view of a threaded fastener setting tool illustrating a representative embodiment of the invention, and showing the tool in initial, or non-operative condition;

Fig. 1a is a projected development view of a portion of the torque control clutch illustrated in the tool of Fig. 1;

Fig. 2 is a cross-section view as seen from line 2—2 of Fig. 1;

Fig. 3 is an enlarged profile view of a cam tooth provided on certain clutch elements in the tool of Fig. 1;

Fig. 7 is a plan view of a bushing or cam ring forming part of the snubber arrangement of the tool shown in Fig. 1;

Fig. 8 is a section view as seen from line 8—8 in Fig. 7;

Fig. 9 is an end view of a wedging ring in the snubber arrangement of the tool shown in Fig. 1;

Fig. 10 is a section view as seen from line 10—10 in Fig. 9;

Fig. 11 is a plan view of a pawl used in the snubber arrangement of the tool shown in Fig. 1;

Fig. 12 is a side view of the pawl shown in Fig. 11;

Fig. 13 is an end view of the pawl shown in Fig. 12; and

Fig. 14 is a graph showing the operating characteristics of the Belleville spring assembly used in the tool shown in Fig. 1.

Figure 4:
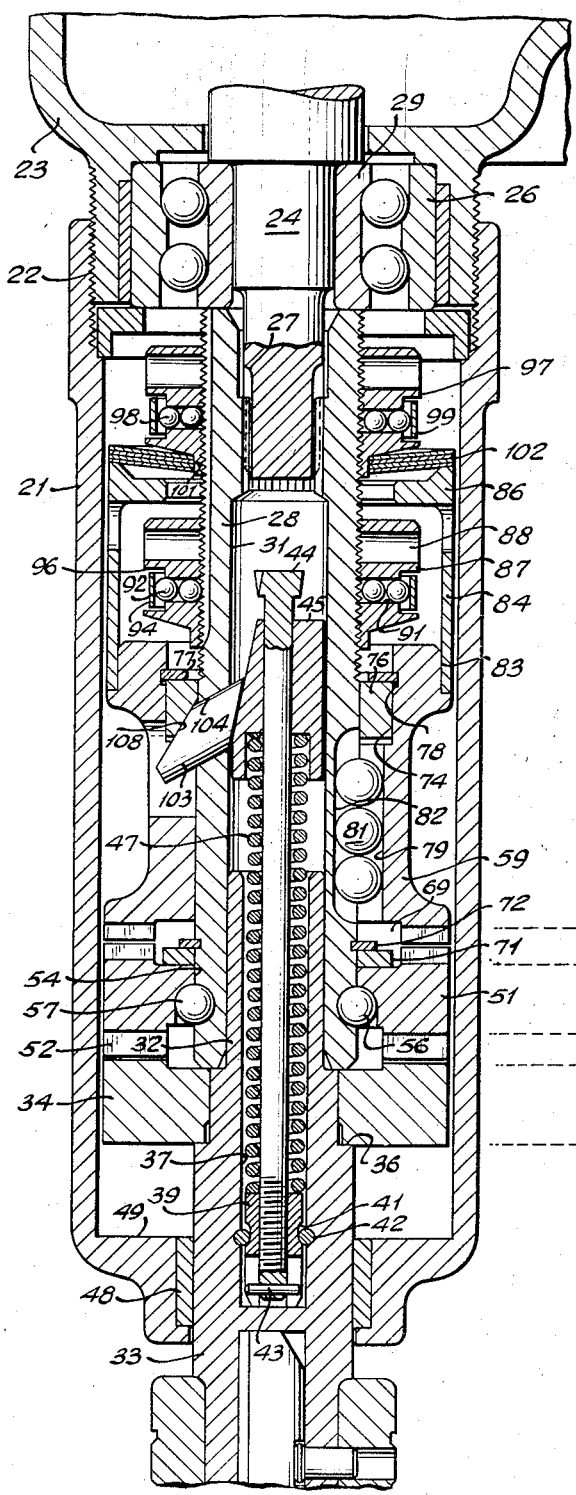
Fig. 4 is a longitudinal section of the tool of Fig. 1 showing the relative position of operative parts after the clutch has been disengaged at predetermined torque load.
Figure 5:
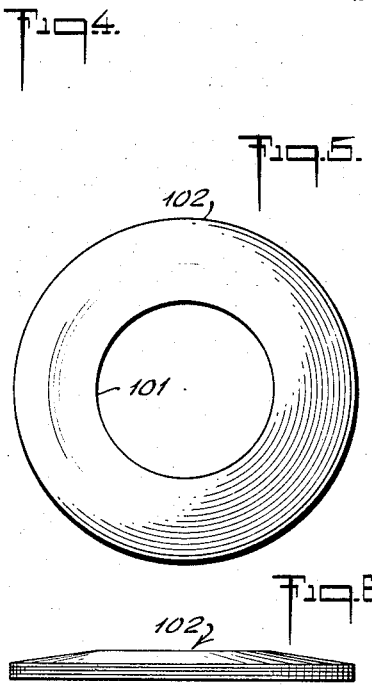
Fig. 5 is a plan view of a Belleville spring assembly used in the torque control clutch of the invention.
Figure 6:
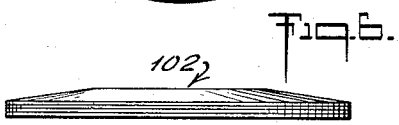
Fig. 6 is an end view of the Belleville spring assembly of Fig. 5.

Referring to Fig. 1, a casing or housing 21 is shown enclosing a torque control mechanism illustrative of an embodiment of the invention, said housing 21 being removably connected, by means such as a threaded connection 22, to a motor housing 23 which encases a rotary power source, e.g., a pneumatic or electric motor (not shown). A motor shaft 24, rotatably supported in the motor housing 23 by means of a ball bearing assembly 26, projects within the housing 21, and has a splined connection 27 with a tubular drive shaft 28, the rear extremity of which is in abutment with the front surface of an inner raceway 29 of the ball bearing 26.

The drive shaft 28 has an elongated bore 31 extending from the splined connection 27 and throughout the length of the drive shaft, and which is adapted to slidingly receive at the forward end, a tubular driven shaft 32 which projects from the housing 21 to form a tool head 33. The tool head may be of suitable shape to receive a socket or chuck (not shown) by means of which a driving connection may be made with the work piece, e.g., a driven nut, bolt or screw (not shown).

The torque control mechanism of the invention includes a manually controlled clutch M and a torque release clutch TR, both clutches being coaxially arranged upon the drive shaft 28 as shown. The manual clutch M includes a driven element, or driven clutch plate, 34, which surrounds and is securely affixed, as by press fit, to the driven shaft 32. The forward surface of the clutch plate 34 abuts a shoulder 36 formed on the periphery of the driven shaft 32.

An elongated bore 37 is formed within the driven shaft 32 for reception of a plunger rod 38, which is threadably secured to a head piece 39, the front extremity of which seats against the bottom of bore 37 formed within the tool head 33. The head piece 39 has an annular grove 41 for receipt of a snap ring 42 which is positionally maintained within the bore 37, such arrangement serving to lock the head piece within the driven shaft 32. A pin 43, is arranged to extend through the plunger rod 38 at each side, and to engage a slot 40 provided in the head piece 39, so that the plunger rod is restrained against turning relative to the head piece. The opposite end of the plunger rod 38 has an integrally formed head 44 serving as an abutment for a wedging ring 45, which surrounds the plunger rod and which is arranged for free sliding movement within the bore 31. Referring to Figs. 9 and 10, the wedging ring 45 is cylindrical in form, and has arranged upon its periphery, three flat surfaces 46 tapering rearwardly and angularly disposed in the relation of a symmetrical triangular pyramid.

A yieldable means in the form of a helical spring 47 surrounds the plunger rod 38 and is compressively maintained between the head piece 39 and the wedging ring 45. Since the wedging ring is arranged to be locked in position within the bore 31, in a manner which will hereinafter be explained, the compressive force of spring 47 will normally urge the driven shaft 32 outwardly from the housing 21, so that the front surface of the clutch plate 34 will engage the end of a bushing 48, and an inner shoulder 49 formed in the forward end of the housing. The manual clutch is thus maintained in neutral, or non-operative position, as shown in Fig. 1.

The manual clutch M also includes an intermediate element, or intermediate clutch plate 51 having conventional jaws 52 in circumferential spaced relation to each other and projecting forwardly from the intermediate clutch plate toward corresponding jaws 53 which project rearwardly from the driven clutch plate 34. The intermediate clutch plate 51 has a bore 54 for rotatable mounting of the plate 51 upon the drive shaft 28, and at the forward end of the bore has a raceway 56 which engages a ball thrust bearing 57 seating in a raceway 58 formed on the periphery of the drive shaft 28.

In the non-operative position of the tool as shown in Fig. 1, the intermediate and driven plates of the manual clutch M are spaced axially apart with the jaws 52 and 53 out of engagement. Also the front extremity of the drive shaft 28 is at a distance from the rear surface of the driven clutch plate 34. In such position, the motor may be operating and the drive shaft 28 and intermediate clutch plate 51 rotating, while the driven clutch plate 34 and tool head 33 are stationary, i.e., not rotating. To engage the manual clutch, the tool operator seats the tool head 33 against the work piece to be driven, and presses the housing 21, 23 of the tool toward the work piece in opposition to the pressure of the spring 47, thereby moving the driven clutch plate 34 to the relative position indicated in Figs. 4 and 4a, and engaging the clutch jaws 52, 53, to cause rotation of the driven clutch plate 34 in unison with the intermediate clutch plate 51.

The torque release clutch TR includes the intermediate clutch plate 51 and a driving clutch element 59. On the rear surface of the intermediate clutch plate 51 are a series of driven teeth 61, which are radially arranged adjacent the outer edge of the clutch plate 51. Referring to an enlarged illustration in Fig. 3 it will be seen that each tooth has a root portion provided with slanting side faces 62 and has a tip provided with faces 63 which extend from the side faces 62 and meet in a crest 64. In the illustrated embodiment the side faces 62 are inclined to have an included angle of 60 degrees, while the tip faces 63 have an included angle of 150 degrees. Segmental grooves 66 separate the teeth. The intermediate plate 51 is arranged for engagement by the driving clutch element 59 by way of driving teeth 67 and grooves 68, corresponding in size and shape with intermediate clutch plate teeth 61 and grooves 66 respectively. The driving and driven teeth 61 and 67 constitute inter-engaging cam means tending to disengage the driving element 59 from the intermediate clutch plate 51 under rotary load. Within the circumferential rows of teeth 61 and 67 is provided a cavity 69 for reception of a spring washer 71 which is maintained in engagement with the rear surface of intermediate clutch plate 51, by means of a snap ring 72 affixed to the drive shaft 28. In the non-operative condition of the tool, Fig. 1, and during part of the operation, the elements 51 and 59 of the torque release clutch are held together with the crests of the teeth of one element slightly spaced from the bottom of the grooves between the teeth on the other element. Means are provided, as will be later described, for adjusting the normal distance between the teeth and the bottom of the grooves or, in other words, the degree of engagement of the teeth 61 and 67. The means for mounting the driving clutch element 59 and for urging it forward against the intermediate clutch plate 51 will now be described.

The driving clutch element 59 is cylindrical in form, and is slidingly mounted by means of a bore 73 upon the drive shaft 28. Toward the rear end of the clutch element is formed a counterbore 74 in which is positioned a bushing or cam ring 76, being held in place by a split ring 77 which is seated in an annular recess 78 formed in the counterbore 74. In order to provide a splined driving connection between the clutch element 59 and the drive shaft 28, the bore 73 is provided with a plurality of longitudinal grooves 79, only one of which is illustrated, each groove being of arcuate shape to maintain a series of balls 81 extending into a similar groove 82 formed in the periphery of the drive shaft 28. At the rear end of the driving clutch element 59 is provided a circumferential groove 83 which receives in press fit engagement a sleeve member 84 which is partially closed at the rear end to form an abutment surface 86.

Enclosed within the sleeve member 84, and threadably affixed to the drive shaft 28 is an adjusting nut 87. The adjusting nut is provided with a plurality of radial holes 88 which are used for reception of an adjusting tool (not shown) for the purpose of rotating the nut 87 upon the drive shaft 28 for adjustment purposes, as will be understood. A series of circumferentially extending slots 89 is arranged in the sleeve member 84 for access to the holes 88 of the adjusting nut 87. In the non-operative condition of the tool, the adjusting nut is maintained in contact with the abutment surface 86 of the sleeve member 84. It will be seen that by rotating the adjusting nut toward the abutment surface 86, the sleeve member 84 will be moved, carrying the driving clutch element 59 rearwardly, thereby moving the clutch teeth 67 toward disengagement from the clutch teeth 61. In such manner the normal degree of engagement of clutch teeth 61 and 67 is regulated. For the purpose of locking the adjusting nut 87 upon the drive shaft 28, two radial holes 91 are arranged in the body of the adjusting nut, each of said holes containing ball sets 92. The innermost ball of a ball set, is adapted to engage one of a plurality of longitudinal splines 93. A flat ring spring 94, positionally maintained in a circumferential groove 96 in the periphery of the adjusting nut, engages each of the outer balls of the ball sets 92, and forces the ball sets in the direction of the longitudinal splines 93. To turn the adjusting nut it is only necessary to apply sufficient rotative force to force the balls out of splined engagement, whereupon after further rotation, the inner ball of the other ball set will fall into engagement with a spline 93. A representative section view of the adjusting nut arrangement may be seen in Fig. 2.

Rearwardly of the sleeve member 84, and threadably affixed to the drive shaft 28, is another adjusting nut 97, similar in construction to adjusting nut 87, and having associated therewith ball sets 98, and a ring spring 99. The forward end of adjusting nut 97 abuttingly supports on a shoulder portion 101, a Belleville spring assembly 102, the outer and forward surface of which is in abutment with the rear edge of the sleeve member 84. The Belleville spring assembly 102 is formed of a plurality of Belleville springs, which are in the nature of disc washers pre-formed in a cone-like fashion, as shown. A feature of the Belleville spring is that it can be made to display an inverted load characteristic, namely, as load is applied in an axial direction, there will be spring deflection with decreasing resistance.

[For a full discussion of the design and characteristics of Belleville springs reference is made to a treatise entitled "The Uniform-Section Disk Spring," by J. O. Almen and A. Laszlo, published in the Transactions of the American Society of Mechanical Engineers, vol. 58, p. 305 et seq. (RP–58–10).]

The graph of Fig. 14, illustrates load-deflection characteristics of the Belleville springs used in the subject invention. Further discussion of the operation of the tool, relative to such characteristics, will follow later. The adjusting nut 97 is used to regulate the degree of precompression of the Belleville spring assembly, which in effect is a factor which determines the force urging the clutch teeth 67 in engagement with the clutch teeth 61.

Figure 4A:
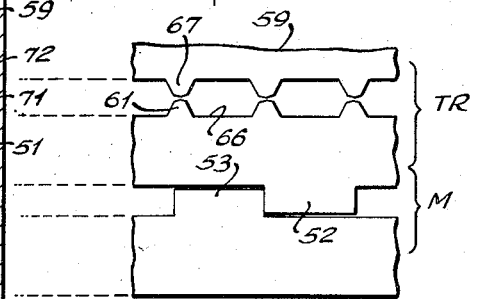
Fig. 4a is a projected development similar to Fig. 1a, but showing the relative position of the clutch parts in the Fig. 4 condition of the tool.

The driving clutch element 59 of the torque release clutch TR will move rearwardly along the drive shaft 28 in response to increased torque and against the pressure of the Belleville spring assembly 102, until the driving connection between the teeth 67 and 61 is interrupted, whereupon the driving clutch element will rotate independently of the intermediate clutch plate 51. At the point of clutch teeth disengagement, the compressive resistance of Belleville spring assembly 102 will be at a minimum as illustrated in Fig. 14, and axial pressure on the driving clutch element 59 will be discontinued. To insure against premature re-engagement, or ratcheting, of the clutch teeth 67 and 61, a locking assembly, or snubber, is provided. The snubber includes three equally spaced pawls 103, each being of generally cylindrical shape and mounted in cylindrical bores 104 formed in the wall of the drive shaft 28. The axis of each bore 104 is generally radial with respect to drive shaft 28, but inclines rearwardly and inwardly by an angle of 20 degrees to a radial line as shown in Fig. 4. At its outer end the pawl 103 has a flat face 106 (Fig. 12) in a plane normal to the axis of the pawl. At the outer rear corner of the pawl is a cam face 107 disposed in a plane inclined 50 degrees with respect to the normal face 104, or 40 degrees with respect to the axis of the pawl. Cam face 107 is adapted to fit a cooperating cam face 108 disposed on the lower and inner edge of the bushing or cam ring 76 as shown in Figs. 1, 2 and 7. Cam faces 107 and 108 engage each other in a plane inclined rearwardly and inwardly at an angle of 30 degrees to the axis of drive shaft 28. The arrangement is such that each pawl 103 resists forward movement of bushing 76, while the latter, under the influence of the Belleville spring assembly 102, opposes outward movement of the pawl along the inclined bore 104. For opposing inward movement of the pawl 103 and urging outward movement thereof, cam faces 109 are provided on the inner front corner of each pawl and on the outer surfaces 46 of the wedging ring 45 respectively. These cam faces engage each other in a plane inclined 60 degrees to the axis of the pawl, or 10 degrees with respect to the axis of drive shaft 28.

*Operation*

Assume that the motor of the tool is off and the parts are in the relative position shown in Fig. 1. In this condition the torque release clutch TR is engaged because the driving clutch element 59 is in forward position and engaged with the intermediate clutch plate 51 by virtue of the compressive force of the Belleville spring assembly 102. The manual clutch M is disengaged due to the action of the helical spring 47 in urging the driven clutch plate 34 forwardly with respect to the housing 21, to thereby maintain the clutch jaws 53 out of engagement with clutch jaws 52, the other end of the spring 47 reacting against the wedging ring 45, which transmits force to the pawls 103, drive shaft 28, inner raceway 29, and the motor shaft 24. The operator then starts the tool motor, thereby initiating rotation of the motor shaft which drives the tubular drive shaft 28, ball spline connection 79, 81, driving clutch element 59, and intermediate clutch plate 51, all of which rotate in unison but without driving the tool head 33, since the manual clutch M is disengaged.

The operator then applies the tool head 33 to the work piece (not shown) to be driven, and manually presses the tool housing 23, 21 forwardly toward the work piece, against the pressure of the precompressed helical spring 47. In a relative sense, the driven clutch plate 34 of the manual clutch M is moved rearwardly in the housing 21, resulting in the engagement of clutch jaws 53 with clutch jaws 52 to thereby initiate rotation of the driven plate 34 in unison with the other rotating parts. Movement of the tool head 33 rearwardly of the housing 21 unseats the plunger rod head 44 from the wedging ring 45. The latter tends to follow the head 44 and thereby wedge the snubber pawls 103 radially outward, however, such wedging movement does not occur at this time because the Belleville spring assembly 102 opposes rearward movement of the cam ring 76, thus obstructing radial outward movement of the snubber pawls.

As the tool head 33 is driven, it meets with increased resistance, but the holding force of spring assembly 102 is sufficient to prevent any relative movement between clutch plates 59 and 51 until the driven nut or bolt has been fastened securely and its resistance to further rotation rises abruptly. As the resistance to rotation of the tool head 33 approaches the maximum torque for which the tool is set, the operative action of the torque release clutch TR is brought into play. Such action consists of the inclined side faces 62 of each driving tooth 67 sliding against the corresponding side faces of the driven teeth 61, which results in the camming of the driving clutch element 59 rearwardly against the force of the Belleville spring assembly 102. Continued sliding engagement of faces 62 terminates when the teeth engage each other on the faces 63, which are of considerably less slope. Such latter engagement continues only for an instant after which the crests 64 of the teeth override each other to thereby release the driving engagement of the driving clutch element 59 from the intermediate clutch plate 51.

It will be noted that when the driving clutch element 59 is moved backward, the pawls 103 of the snubber are released for movement outwardly, i.e., in a direction away from the plunger rod 38, by indirect action of spring 47, and are maintained in such position so that bushing 76 is effective to keep the driving element 59 locked in position at the extent of its backward movement. The relative position of the driving element 59 with regard the Belleville spring assembly 102, is arranged so that at the instant the teeth crests 64 over-ride each other, compressive force on the driving element is at a minimum as heretofore described, thus the pawls, under action of the spring 47, will move the driving element to a further rearward position so that the clutch teeth 67 are in spaced engagement from the clutch teeth 61. In such position, driving rotation of the tool head 33 ceases, since the intermediate plate 51 is disengaged from the driving clutch element 59, thereby rendering the driven clutch plate 34 inoperative.

The manner of adjusting the relative position of the driving element 59 and the Belleville spring assembly 102, will best be understood by referring to Fig. 14. From the curve shown on the graph, which is merely representative since each design, or assembly, of Belleville springs will give a particular curve, it will be seen that the characteristics of the Belleville springs is such that as load is initially applied in an axial direction by the adjusting nut 97, a spring deflection will occur until the region of the curve indicated by "A" is realized. Further spring deflection will be had at a decreasing load until a point somewhere between "C" and "D" is reached, at which time the compressive resistance of the Belleville springs will be at a minimum, and will allow further rearward movement of the driving element 59. The adjusting nut 97 is used to preload the Belleville springs 102 to a point "A" on the curve, while adjusting nut 87 is used to regulate the degree of engagement of clutch teeth 67 with clutch teeth 61, or as represented on Fig. 14, between point "A" and one of the points A1, A2 or A3. Minimum driving torque will be realized at point "B," in which case the clutch teeth 61, 67 will be engaged only about ten thousandths of an inch. Upon disengagement of the clutch teeth 61, 67 the corners of the teeth, between surfaces 62 and 63, will pass each other at approximately point "C" and the crests 64, will pass each at approximately point "D." Further separation of the teeth and deflection of the Belleville spring assembly will occur because of axial momentum imparted to the driving clutch element 59. The amount of separation will be influenced by the nature of the work (gathering vs. sudden stopping), and by the speed of rotation of the tool motor. At predetermined torque cut-off, the separation of teeth 61, 67 is accomplished very rapidly and in the absence of any accidental re-engaging or impacting effect. The setting of adjusting nut 87 will determine whether the torque release clutch TR will begin to operate, (i.e. disengage), at point A1, A2 or A3.

To condition the tool for another operation, it is necessary to move the tool head away from the work piece, whereupon the Belleville spring assembly 102, and the helical spring 47 will urge the tool head 33 forward relative to the housing 21, thereby disengaging the manual clutch M, and seating the driven clutch plate 34 against the wall 49 of the housing, as shown in Fig. 1. Rearward movement of the housing 21 relative to the tool head is accompanied by rearward movement of the tubular drive shaft 28 and snubber pawls 103 relative to the plunger rod 38. The wedging ring 45 at first follows the pawls in such rearward movement, in response to the expansion of spring 47, but after traveling only a short distance the wedging ring is stopped by contact with the plunger head 44 on the plunger rod 38, whereupon the spring 47 attains the maximum limit of its expansion and its minimum compressive force. Continued rearward movement of the pawls 103, relative to the wedging ring 45 as well as rod 38, withdraws the pawls toward the narrow end of the wedging ring. Thus the outward and rearward pressure of the wedging ring 45 on pawls 103 is relieved, to the extent that the bushing 76, acting in response to Belleville spring assembly 102 and through the inclined faces 107, 108, forces the pawls 103 inwardly, i.e., toward plunger rod 38. Expansion of the Belleville spring assembly 102 forwardly, is accompanied by forward movement of the driving clutch element 59, so that the clutch teeth 67 will again be engaged with clutch teeth 61, as illustrated in Figs. 1 and 1a. Inward movement of the pawls 103 is permitted as a result of the cam action between faces 109 and 46 in shifting the wedging ring 45 forward, the latter in turn acting through spring 47 and plunger head 39 to project the tool head 33 from housing 21. The tool will thus be ready for another operating cycle, as heretofore described. Between cycles the driving clutch element 59 and intermediate plate 51, rotate with the motor but the driving clutch plate 34 and tool head 33 do not rotate.

The clutch teeth and clutch grooves are all symmetrically arranged to enable the tool to drive in either a clockwise or counterclockwise direction of rotation with release at the same predetermined value of torque. The reversible feature enables the tool to be used for tightening nuts, bolts or screws having a left hand thread whenever the occasion arises, without necessitating any resetting of the clutch in changing from right hand to left hand operation, or vice versa. The invention of course is not limited in its application to the driving of threaded fasteners, such as bolts, nuts or screws, but has general application to tools, machines, instruments or other apparatus which require a clutch mechanism arranged to insure sufficient torque as well as to prevent excessive torque for any specific adjustment, that is, to deliver predetermined torque within close limits.

What is claimed is:

1. A torque control clutch device comprising coaxially rotatable driving and driven members, inter-engaging clutch teeth including cam means on said members for the transmission of torque therebetween with an axial component of force tending to separate the members, resisting means opposing said separation with a diminishing holding force as separation increases, and a locking means responsive to such separation arranged so as to continuously prevent re-engaging movement of the said members as they are in the process of separating and to hold them disengaged upon complete separation thereof.

2. A torque control clutch device comprising a driving clutch element, an intermediate clutch element, and a driven clutch element coaxially and rotatably arranged, inter-engaging clutch teeth including cam means on the driving and intermediate clutch members for the transmission of torque therebetween with an axial component of force tending to separate the members, a Belleville spring assembly yieldingly resisting said separation, an adjusting means for establishing a predetermined torque load at which the members will start to separate, and a blocking means responsive to such separation arranged so as to continuously block re-engaging movement of the said members as they are in the process of separating and to hold them blocked against re-engagement upon complete separation thereof.

3. A torque control clutch device according to claim 2, wherein the driven clutch element is movable axially and has clutch jaws engageable with clutch jaws on the intermediate clutch element.

4. In a tool of the class described, a housing, a clutch mechanism mounted therein and including a torque release clutch and a manual clutch, said torque release clutch having a driving clutch element and an intermediate clutch element both of which are supported upon a drive shaft, each of said clutch elements having inter-engaging teeth with camming surfaces adapted to force the driving clutch element axially away from the intermediate clutch element, a Belleville spring assembly urging the driving clutch element into engagement by way of the clutch teeth with the intermediate clutch element, said manual clutch being mounted upon a shaft which is supported by the drive shaft and including a driven clutch element having clutch jaws engageable with co-operating clutch jaws formed upon the intermediate clutch element, a compression means arranged to urge the driven clutch element out of engagement with the intermediate clutch element and follower locking means associated with the driving clutch element and arranged to simultaneously follow in contact with the driving clutch element as the latter moves away from the intermediate clutch element and to block it against return movement toward the intermediate clutch element.

5. In a tool according to claim 4, wherein the cam engaging portions of the clutch teeth are arranged at different angles, the slope being steeper at the root of the tooth than at the tip whereby to require greater torque to cause separating of the driving clutch element from the intermediate clutch element when the teeth are fully engaged than when they are in contact at the tips.

6. In a tool according to claim 4, wherein the torque release clutch is maintained in disengaged condition by action of the locking means until the manual clutch is first disengaged from the intermediate clutch element by movement of the tool away from the work piece being operated upon.

7. In a power tool, a housing having a rotatable tool head at its front end and enclosing a tubular shaft disposed coaxially of the tool head, a torque release clutch comprising a driving element mounted upon said shafts for relative longitudinal movement only, and an intermediate element mounted upon said shaft for relative angular motion only, said clutch having inter-engaging cam means for moving the driving element rearwardly and out of operative connection with the intermediate element at a predetermined torque load on the tool head, a Belleville spring assembly arranged to urge the driving element into operative connection with the intermediate element, a manual clutch interposed between the intermediate element and the tool head, said manual clutch having jaws which are normally disengaged but adapted to engage complementary jaws on the intermediate element upon application of manual pressure to the tool head to move the latter relative to the housing, and a snubber for inhibiting re-engagement of the driving element with the intermediate element until manual pressure is released from the tool head, said snubber comprising a pawl mounted in a bore in the shaft, said pawl having a rearwardly and inwardly inclined face engaging a corresponding face carried by the driving element, said snubber also comprising a wedge engaging the inner end of the pawl, said wedge being urged rearwardly by resilient means to tend to cam the pawl outwardly in locking relation to the driving element.

8. A power tool according to claim 7 in which the resilient means is arranged to urge the manual clutch forwardly toward the tool head at the same time that it urges the wedge rearwardly, said resilient means releasing a part of its force on the wedge when it is permitted to disengage the manual clutch whereby to permit the rear clutch plate to move forward by camming the pawl inward and the wedge forward.

9. A power tool according to claim 7, wherein an adjusting means is provided to regulate the degree of compression thereof against the driving element.

10. A power tool according to claim 7, wherein an adjusting means is provided to regulate the degree by which the cam means of the driving element are engaged with the cam means of the intermediate element.

11. A torque control device comprising coaxially rotatable driving and driven members wherein the driving member is axially movable relative to the driven member, interengaging clutch teeth including cam means on said members for the transmission of torque therebetween with an axial component of force tending to separate the driving from the driven member, resisting means axially acting on the driving member and opposing said separation with a diminishing holding force as separation increases, and follower blocking means responsive to such separation arranged so as to follow and block re-engaging movement of the driving member as it progressively separates and to hold it blocked against re-engagement upon complete separation thereof.

References Cited in the file of this patent

UNITED STATES PATENTS

| | | |
|---|---|---|
| 1,684,633 | Levedahl | Sept. 18, 1928 |
| 1,954,620 | Connell | Apr. 10, 1934 |
| 2,256,781 | Nelson | Sept. 23, 1941 |
| 2,263,709 | Van Sittert | Nov. 25, 1941 |
| 2,728,252 | Connell | Dec. 27, 1955 |
| 2,741,352 | Stevens et al. | Apr. 10, 1956 |
| 2,765,059 | Amtsberg | Oct. 2, 1956 |
| 2,765,890 | Pederson et al. | Oct. 9, 1956 |

FOREIGN PATENTS

| | | |
|---|---|---|
| 87,260 | Germany | Apr. 28, 1920 |